(12) United States Patent
Zhang et al.

(10) Patent No.: US 10,686,909 B2
(45) Date of Patent: Jun. 16, 2020

(54) METHOD FOR DATA SUBSCRIBING AND PUBLISHING IN LARGE SCALE CORS STATION BROADCAST SYSTEM AND DEVICE THEREOF

(71) Applicant: QIANXUN SPATIAL INTELLIGENCE INC., Shanghai (CN)

(72) Inventors: Tiliang Zhang, Shanghai (CN); Da Zhang, Shanghai (CN)

(73) Assignee: QIANXUN SPATIAL INTELLIGENCE INC., Shanghai (CN)

( * ) Notice: Subject to any disclaimer, the term of this patent is extended or adjusted under 35 U.S.C. 154(b) by 306 days.

(21) Appl. No.: 15/787,299

(22) Filed: Oct. 18, 2017

(65) Prior Publication Data

US 2018/0109646 A1    Apr. 19, 2018

(30) Foreign Application Priority Data

Oct. 18, 2016   (CN) .......................... 2016 1 0908848

(51) Int. Cl.
*H04L 29/08*   (2006.01)

(52) U.S. Cl.
CPC .............. *H04L 67/32* (2013.01); *H04L 67/14* (2013.01); *H04L 67/16* (2013.01); *H04L 67/30* (2013.01)

(58) Field of Classification Search
CPC ......... H04L 67/32; H04L 67/14; H04L 67/16; H04L 67/30
See application file for complete search history.

(56) References Cited

U.S. PATENT DOCUMENTS

| | | | | |
|---|---|---|---|---|
| 2008/0284643 | A1* | 11/2008 | Scherzinger | G01C 21/005 342/357.31 |
| 2014/0253374 | A1* | 9/2014 | Tibout | G01S 19/04 342/357.42 |
| 2016/0061958 | A1* | 3/2016 | Cihlar | G01S 19/07 342/357.44 |
| 2018/0106906 | A1* | 4/2018 | Mikami | G01S 19/07 |

\* cited by examiner

*Primary Examiner* — Benjamin M Thieu
(74) *Attorney, Agent, or Firm* — Hamre, Schumann, Mueller & Larson, P.C.

(57) ABSTRACT

A satellite positioning field, a method for data subscribing and publishing in large scale CORS station broadcast system and device thereof are disclosed. In the process of data subscribing, publishing and establishing a connection, the whole broadcast system combines the subscribing, publishing and upstream and downstream data management together, shields the specific machine information, the users only need to care about what data they need, the system framework itself flexibly establishes the connection with the upstream work node according to the route selection strategy, which facilitates the serialization and management of the upstream and downstream modules, saves the cost of repeated development.

8 Claims, 5 Drawing Sheets

METHOD FOR DATA SUBSCRIBING AND PUBLISHING IN LARGE SCALE CORS STATION BROADCAST SYSTEM AND DEVICE THEREOF

FIELD OF THE INVENTION

The present invention relates to satellite positioning field, particularly relates to data subscribing and publishing technology in large scale CORS (Continuously Operating Reference Stations) station broadcast system.

BACKGROUND OF THE INVENTION

With the development and popularization of satellite positioning technology, communication technology and computer network technology, the public demand for location service is getting higher and higher. Differential positioning as a convenient way to significantly improve the positioning accuracy, has been widely accepted by the public. The differential positioning method relies on the data broadcasted by the CORS station. However, the current CORS station is basically independent of each project, and each area is independent. There is a problem that the CORS station is repeated constructed and the resource utilization rate is not high. The nationwide network project can greatly solve this problem, the purpose of the project is to converge the national CORS station data to the data center, and then broadcast out after processing according to the needs of users. At this time, a powerful system is needed to handle the convergence and push of the CORS station data and to reduce the delay of the broadcast data as much as possible.

The existing technical programs are basically maintained in a small scale, such as to build a station within the scope of a province or a city, and then the users within the scope use, and the users tend to be professional users, the user base is small. And for specific equipment, such as the purchasing a company's virtual reference network, other equipments are not compatible.

In the traditional source station broadcast system, because the receiver's service capacity is relatively weak, whether it is the original data or RTCM (Radio Technical Commission for Maritime Services) data to be broadcasted, the bandwidth is relatively small, while the number of concurrent connections supported is also very limited, which greatly reduced the service scope of the receiver.

To sum up, the shortcomings of the prior art mainly include the following:

1. High dependence on manufacturers. Purchase equipments from one manufacture, VRS and broadcast is likely to use the equipment of the manufacturer, can't be widely compared to multi manufactures' devices.

2. Small scale of networking. Now the networking technology is basically in a small scale, such as within the scope of a province or a city, but in different provinces and cities the information is not universal, a nationwide network construction can't be achieved, which causes inconvenience of information broadcast.

3. Low availability. If one or a few base stations fail, a large area nearby may not be able to improve services, and other base stations can't be introduced immediately to provide services.

4. Low scalability. Without a unified configuration center, after a small scale of networking, if you want to add more stations, the process is complex, the operability is poor.

Therefore, there is an urgent need for a new large scale CORS station broadcast system that can extend the service nodes vertically and horizontally, providing the possibility of the large scale broadcast of the receiver data on the network, making the service capability hundreds of times enhanced.

SUMMARY OF THE INVENTION

The purpose of the present invention is to method for data subscribing and publishing in large scale CORS station broadcast system and device thereof, in the process of data subscribing, publishing and establishing a connection, combines the subscribing, publishing and upstream and downstream data management together, shields the specific machine information, the users only need to care about what data they need, the system framework itself flexibly establishes the connection with the upstream work node according to the route selection strategy, which facilitates the serialization and management of the upstream and downstream modules, saves the cost of repeated development.

In order to solve the above technical problem, one embodiment of the present invention discloses a method for data subscribing and publishing in large scale CORS station broadcast system, comprises the following steps:

A source station data receiver cluster requests to subscribe to the original data of the CORS station, and obtains connection information of the CORS station;

the source station data receiver cluster establishes a connection with the CORS station, obtains the original data of the CORS station and stores the original data of the CORS station in a server of the source station data receiver cluster;

the source station data receiver cluster requests to publish the original data of the CORS station, and stores the message of requesting to publish the original data of the CORS station and the connection information of the server storing the original data of the CORS station in a database; and a network RTD (Real-time Differential)/RTK (Real-time Kinematic) algorithm cluster requests to subscribe to the original data of the CORS station, obtains the connection information of the server storing the original data of the CORS station from the database and establishes a connection with the server, obtains the original data of the CORS station, and stores the message of subscribing to the original data of the CORS station in the database.

Another embodiment of the present invention discloses a device for data subscribing and publishing in large scale CORS station broadcast system, comprises: a source station data receiver cluster, a network RTD/RTK algorithm cluster, a database and a plurality of CORS stations;

the source station data receiver cluster comprises: a subscribing module, a publishing module and a plurality of servers;

the subscribing module of the source station data receiver cluster configured to request to subscribe to the original data of the CORS station, and obtain connection information of the CORS station; and establish a connection with the CORS station, obtain the original data of the CORS station and store the original data of the CORS station in the servers of the source station data receiver cluster;

the publishing module of the source station data receiver cluster configured to request to publish the original data of the CORS station, and store the message of requesting to publish the original data of the CORS station and the connection information of the server storing the original data of the CORS station in the database; and the network RTD/RTK algorithm cluster comprises: a subscribing module configured to request to subscribe to the original data of the CORS station, obtain the connection information of the server storing the original data of the CORS station from the database and establish a connection with the server, obtain the original data of the CORS station, and store the message of subscribing to the original data of the CORS station in the database.

Comparing the embodiments of the present invention with prior arts, the main distinctions and their effects are:

During the process of data subscribing, publishing and establishing a connection, the whole broadcast system combines the subscribing, publishing and upstream and downstream data management together, shields the specific machine information, the users only need to care about what data they need, the system framework itself flexibly establishes the connection with the upstream work node according to the route selection strategy, which facilitates the serialization and management of the upstream and downstream modules, saves the cost of repeated development.

Further, provides a unified coding/decoding method to receive CORS station data from different manufacturers, and decode the data into a standard internal format through different decoding algorithms, which facilitates the use for internal projects, and then code the data into the standard RTCM Data and broadcast through the NTRIP (Networked Transport of RTCM via Internet Protocol) protocol when needs to be broadcasted out, which eliminates the dependence on the manufacturers.

DETAILED DESCRIPTION OF THE PREFERRED EMBODIMENTS

In the following description, many technical details are provided for readers to better understand the present application. However, it is understood by those ordinary skilled in the art that the technical solution claimed to be protected by those claims of the present application can also be realized even without these technical details and not based on various changes and modifications of the following embodiments.

For the purpose, technical solution and merits of the present invention to be clearer, the following will further describe the embodiments of the present invention in detail with reference to the accompanying drawings.

Term Interpretation

GNSS: Global Navigation Satellite System;

CORS: Continuous Operation (satellite positioning service) Reference Station, real-time access to satellite data and transmission.

RTK: Real—time kinematic carrier phase difference technology, can achieve centimeter accuracy;

RTD: Real Time Differential, Real-time dynamic code phase difference technology can achieve sub-meters accuracy;

NTRIP: Networked Transport of RTCM via Internet Protocol, the protocol for differential data transmission on the Internet, which is based on TCP/IP and belongs to the application layer protocol;

NTRIP CASTER: The node that provides the broadcast service based on the NTRIP protocol;

RTCM: Radio Technical Commission for Maritime services, which introduced a variety of differential protocol standards;

Differential positioning refers to a method based on the pseudo-range or carrier correction provided by a third party, and corrects the data of the user strategy to improve the positioning accuracy.

Figure 1:
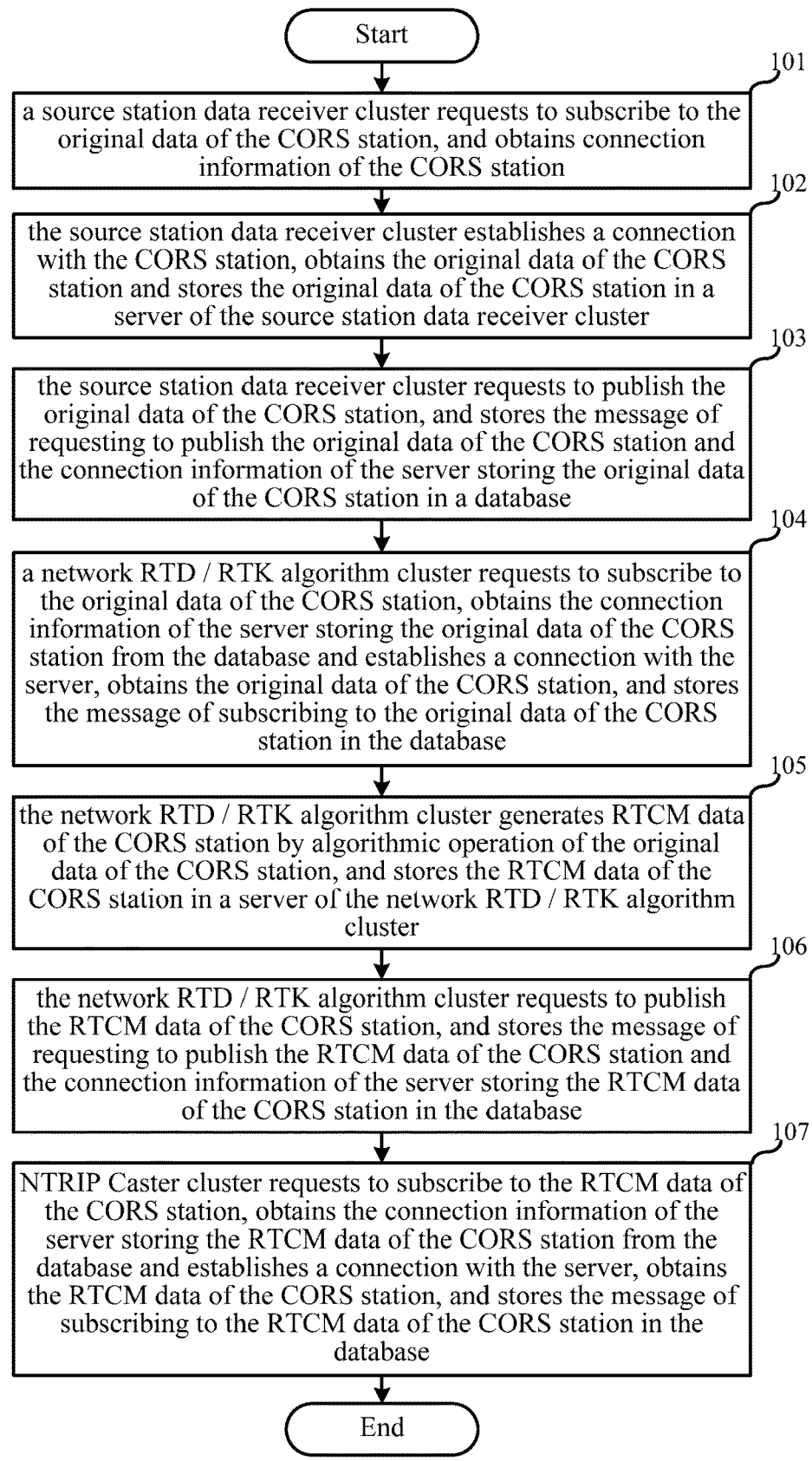
FIG. 1 is a flow diagram of a method for data subscribing and publishing in large scale CORS station broadcast system according to first embodiment of the present invention.

The first embodiment of the present invention relates to a method for data subscribing and publishing in large scale CORS station broadcast system. FIG. 1 is a flow diagram of the method for data subscribing and publishing in large scale CORS station broadcast system.

Specifically, as shown in FIG. 1, the method for data subscribing and publishing in large scale CORS station broadcast system comprises the following steps:

At step 101, a source station data receiver cluster requests to subscribe to the original data of the CORS station, and obtains connection information of the CORS station.

Then proceeds to step 102, the source station data receiver cluster establishes a connection with the CORS station, obtains the original data of the CORS station and stores the original data of the CORS station in a server of the source station data receiver cluster.

Further, preferably, the step of "obtains the original data of the CORS station and stores the original data of the CORS station in a server of the source data receiver cluster" further comprises the following sub-step:

The original data of the CORS station are decoded and converted into a public data type for use by other clusters.

In the large scale CORS station broadcast system, provides a unified coding/decoding method to receive CORS station data from different manufacturers, and decode the data into a standard internal format through different decoding algorithms, which facilitates the use for internal projects, and then code the data into the standard RTCM Data and broadcast through the NTRIP protocol when needs to be broadcasted out, which eliminates the dependence on the manufacturers.

Then proceeds to step 103, the source station data receiver cluster requests to publish the original data of the CORS station, and stores the message of requesting to publish the original data of the CORS station and the connection information of the server storing the original data of the CORS station in a database.

Then proceeds to step 104, a network RTD/RTK algorithm cluster requests to subscribe to the original data of the CORS station, obtains the connection information of the server storing the original data of the CORS station from the database and establishes a connection with the server, obtains the original data of the CORS station, and stores the message of subscribing to the original data of the CORS station in the database.

Then proceeds to step 105, the network RTD/RTK algorithm cluster generates RTCM data of the CORS station by algorithmic operation of the original data of the CORS station, and stores the RTCM data of the CORS station in a server of the network RTD/RTK algorithm cluster.

Then proceeds to step 106, the network RTD/RTK algorithm cluster requests to publish the RTCM data of the CORS station, and stores the message of requesting to publish the RTCM data of the CORS station and the connection information of the server storing the RTCM data of the CORS station in the database.

Then proceeds to step 107, NTRIP Caster cluster requests to subscribe to the RTCM data of the CORS station, obtains the connection information of the server storing the RTCM data of the CORS station from the database and establishes a connection with the server, obtains the RTCM data of the CORS station, and stores the message of subscribing to the RTCM data of the CORS station in the database.

Then ends the flow.

In the process of data subscribing, publishing and establishing a connection, the whole broadcast system combines the subscribing, publishing and upstream and downstream data management together, shields the specific machine information, the users only need to care about what data they need, the system framework itself flexibly establishes the connection with the upstream work node according to the route selection strategy, which facilitates the serialization and management of the upstream and downstream modules, saves the cost of repeated development.

Figure 2:
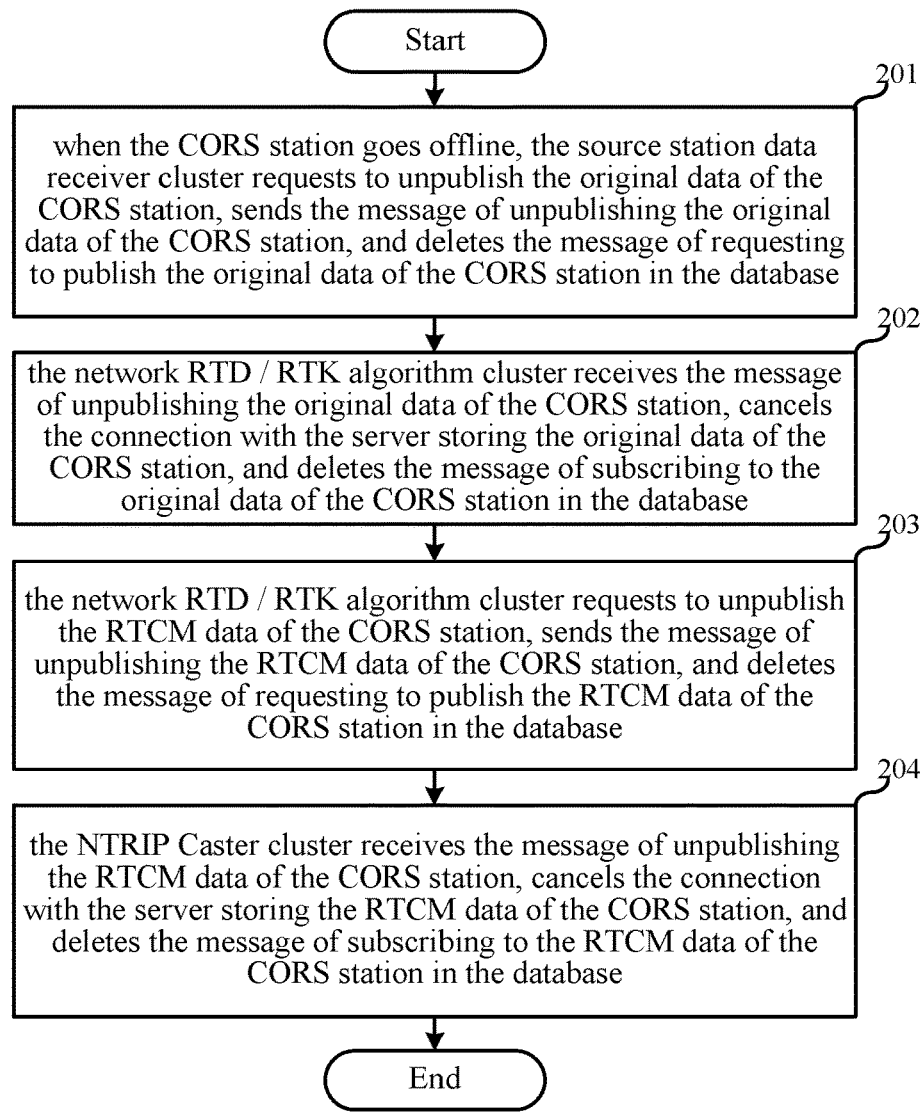
FIG. 2 is a flow diagram of a method for data subscribing and publishing in large scale CORS station broadcast system according to second embodiment of the present invention.

The second embodiment of the present invention relates to a method for data subscribing and publishing in large scale CORS station broadcast system. FIG. 2 is a flow diagram of the method for data subscribing and publishing in large scale CORS station broadcast system.

The second embodiment has been improved on the basis of the first embodiment, and the main improvement is that:

The method for data subscribing and publishing in large scale CORS station broadcast system further comprises the following steps:

Specifically, as shown in FIG. 2,

At step 201, when the CORS station goes offline, the source station data receiver cluster requests to unpublish the original data of the CORS station, sends the message of unpublishing the original data of the CORS station, and deletes the message of requesting to publish the original data of the CORS station in the database.

Then proceeds to step 202, the network RTD/RTK algorithm cluster receives the message of unpublishing the original data of the CORS station, cancels the connection with the server storing the original data of the CORS station, and deletes the message of subscribing to the original data of the CORS station in the database.

Then proceeds to step 203, the network RTD/RTK algorithm cluster requests to unpublish the RTCM data of the CORS station, sends the message of unpublishing the RTCM data of the CORS station, and deletes the message of requesting to publish the RTCM data of the CORS station in the database.

Then proceeds to step 204, the NTRIP Caster cluster receives the message of unpublishing the RTCM data of the CORS station, cancels the connection with the server storing the RTCM data of the CORS station, and deletes the message of subscribing to the RTCM data of the CORS station in the database.

Then ends the flow.

In the second embodiment, the steps of canceling the subscribing and canceling the publishing are disclosed in the method for data subscribing and publishing in large scale CORS station broadcast system.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

The method embodiments of the present invention all can be realized by software, hardware and firmware etc. Regardless of the present invention is realized by software, or hardware, or firmware, instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

Figure 3:
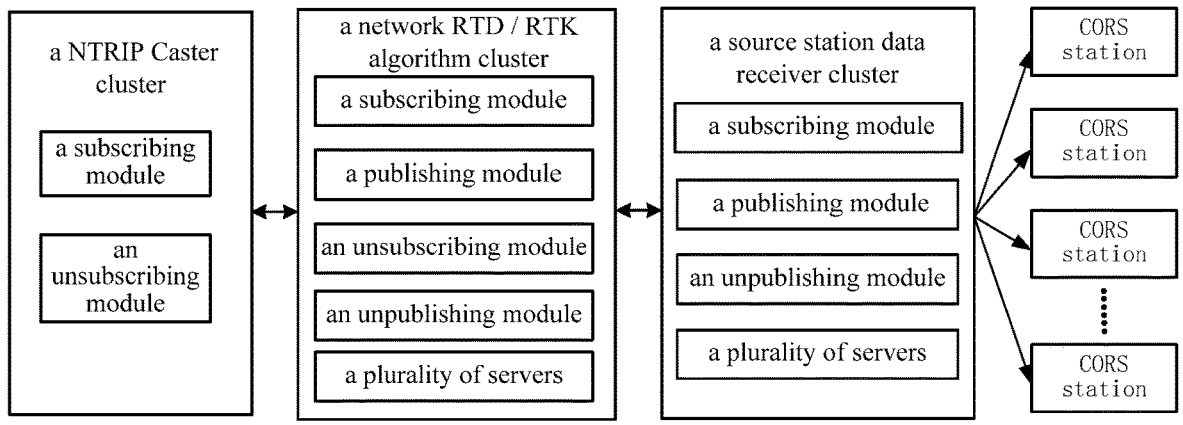
FIG. 3 is a structure diagram of a device for data subscribing and publishing in large scale CORS station broadcast system according to third and fourth embodiments of the present invention.

The third embodiment of the present invention relates to a device for data subscribing and publishing in large scale CORS station broadcast system. FIG. 3 is a structure diagram of the device for data subscribing and publishing in large scale CORS station broadcast system.

Specifically, as shown in FIG. 3, the device for data subscribing and publishing in large scale CORS station broadcast system comprises: a source station data receiver cluster, a network RTD/RTK algorithm cluster, a NTRIP Caster cluster, a database (not shown in the figures) and a plurality of CORS stations.

The source station data receiver cluster comprises: a subscribing module, a publishing module and a plurality of servers.

The subscribing module of the source station data receiver cluster configured to request to subscribe to the original data of the CORS station, and obtain connection information of the CORS station; and establish a connection with the CORS station, obtain the original data of the CORS station and store the original data of the CORS station in the servers of the source station data receiver cluster;

The publishing module of the source station data receiver cluster configured to request to publish the original data of the CORS station, and store the message of requesting to publish the original data of the CORS station and the connection information of the server storing the original data of the CORS station in the database;

Further, preferably, the source station data receiver cluster further comprises: a decoding module (not shown in the figures) configured to decode the original data of the CORS station obtained by the subscribing module of the source station data receiver cluster and convert the original data of the CORS station into a public data type for use by other clusters.

The network RTD/RTK algorithm cluster comprises: a subscribing module configured to request to subscribe to the original data of the CORS station, obtain the connection information of the server storing the original data of the CORS station from the database and establish a connection with the server, obtain the original data of the CORS station, and store the message of subscribing to the original data of the CORS station in the database.

The network RTD/RTK algorithm cluster further comprises: an operation module (not shown in the figures), a publishing module and a plurality of servers.

The operation module configured to generate RTCM data of the CORS station by algorithmic operation of the original data of the CORS station, and store the RTCM data of the CORS station in the servers of the network RTD/RTK algorithm cluster.

The publishing module of the network RTD/RTK algorithm cluster configured to request to publish the RTCM data of the CORS station, and store the message of requesting to publish the RTCM data of the CORS station and the connection information of the server storing the RTCM data of the CORS station in the database.

The NTRIP Caster cluster comprises: a subscribing module configured to request to subscribe to the RTCM data of the CORS station, obtain the connection information of the server storing the RTCM data of the CORS station from the database and establish a connection with the server, obtain the RTCM data of the CORS station, and store the message of subscribing to the RTCM data of the CORS station in the database.

The first embodiment is the method embodiment corresponding to this embodiment, and this embodiment and the first embodiment can be implemented in cooperation with each other. Correlated technical details disclosed in the first embodiment are still effective in this embodiment and will not be repeated here in order to reduce duplication. Correspondingly, correlated technical details disclosed in this embodiment can also be applied in the first embodiment.

The fourth embodiment of the present invention relates to a device for data subscribing and publishing in large scale CORS station broadcast system.

The fourth embodiment has been improved on the basis of the third embodiment, and the main improvement is that:

As shown in FIG. 3, the source station data receiver cluster further comprises: an unpublishing module.

The unpublishing module of the source station data receiver cluster configured to request to unpublish the original data of the CORS station when the CORS station goes offline, send the message of unpublishing the original data of the CORS station, and delete the message of requesting to publish the original data of the CORS station in the database.

The network RTD/RTK algorithm cluster further comprises: an unsubscribing module and an unpublishing module;

The unsubscribing module of the network RTD/RTK algorithm cluster configured to receive the message of unpublishing the original data of the CORS station, cancel the connection with the server storing the original data of the CORS station, and delete the message of subscribing to the original data of the CORS station in the database; and The unpublishing module of the network RTD/RTK algorithm cluster configured to request to unpublish the RTCM data of the CORS station, send the message of unpublishing the RTCM data of the CORS station, and delete the message of requesting to publish the RTCM data of the CORS station in the database.

The NTRIP Caster cluster further comprises: an unsubscribing module configured to receive the message of unpublishing the RTCM data of the CORS station, cancel the connection with the server storing the RTCM data of the CORS station, and delete the message of subscribing to the RTCM data of the CORS station in the database.

The second embodiment is the method embodiment corresponding to this embodiment, and this embodiment and the second embodiment can be implemented in cooperation with each other. Correlated technical details disclosed in the second embodiment are still effective in this embodiment and will not be repeated here in order to reduce duplication. Correspondingly, correlated technical details disclosed in this embodiment can also be applied in the second embodiment.

It should be noted that modules disclosed in each device embodiment of the present invention are logical modules, on the physical, a logic module can be a physical module, and may be part of a physical module, or implemented in combination of several physical modules, and physical implementing methods for these logic modules themselves are not the most important, the combination of the functions achieved by these logic modules is the key to solving the technical problem disclosed in the present invention. Furthermore, in order to highlight innovative part of the present invention, the above device embodiments of the present invention do not introduce the modules which are not related closely to solving the technical problem disclosed in the present invention, which does not indicate that the above device embodiments do not include other modules.

The fifth embodiment is a preferred embodiment of the present invention.

Figure 4:
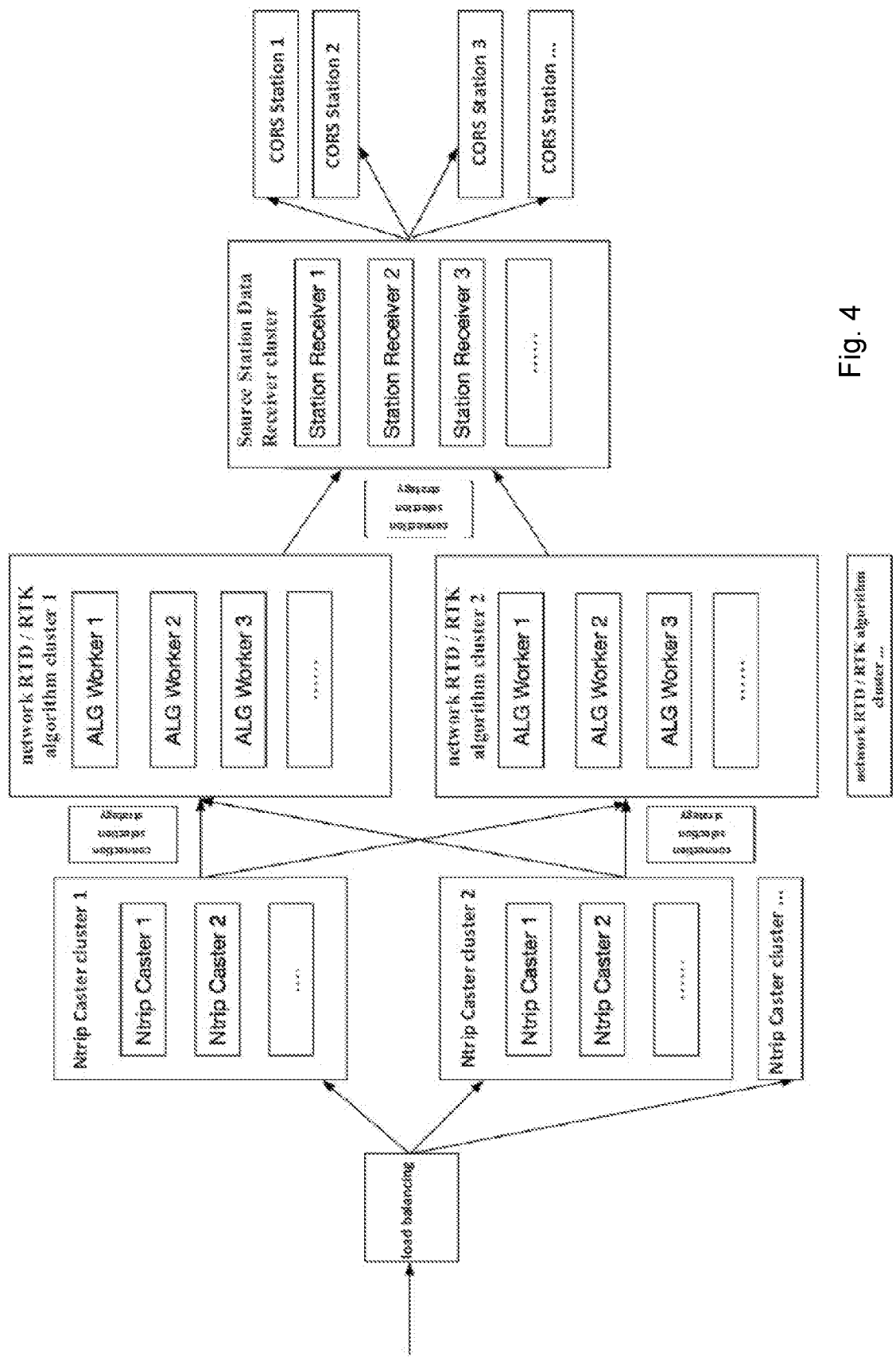
FIG. 4 is a flow diagram of the whole flow of the broadcast according to fifth embodiment of the present invention.

5.1 the Main Components of the Present Invention 5.1.1 the Whole Flow of the Broadcast The whole flow of the broadcast is shown in FIG. 4, the whole system is divided into five parts: a load balancing server, a Ntrip Caster cluster, a network RTD/RTK algorithm cluster, a source station data receiver cluster, a source station, each flow is described in detail below. It should be noted, in FIG. 4, ALG Worker refers to the Application Layer Gateway Work server (Application Layer Gateway Worker), Station Receiver refers to the source station data receiver server.

1. A Load Balancing Server

User request first reaches the load balancing server in the public network, the server configures the address of a plurality of Ntrip Casters. After the request arrives, it can be routed to a different Ntrip Caster by the server according to the configured load balancing policy, such as according to the source IP address of the user, different Mount Points, and so on. The load balancing server only play a role in routing, specifically it can work in the fourth layer, can also work in the seventh layer, as long as the request can be routed according to the specific strategy.

2. A Ntrip Caster Cluster

The Ntrip Caster cluster is the first layer that provides the actual broadcast server, and is the Caster Server implemented based on the Ntrip protocol. The role of the server is to authenticate the user's request and to select different data to broadcast to the user according to the Mount Point specified by the user.

The data broadcasted to the user by the Caster is subscribed from the upper network RTD/RTK algorithm cluster, the data calculated by the algorithm cluster are transmitted to the Caster in real time, after receives the data, the caster transmits the data asynchronously to the user who needs the data, so that the delay is minimized.

3. A Network RTD/RTK Algorithm Cluster

The cluster meshes the received CORS station data to provide virtual, grid services for the area near each station.

4. A Source Station Data Receiver Cluster

The main responsibility of the cluster is to receive the Cors station data, because of the particularity of Cors station, it can't support too many connections at the same time, it needs the data receiver cluster to receive the data from the source station, and forward it to other downstream clusters.

In addition, the cluster integrates the corresponding decoding methods for different manufactures of Cors stations, and then converts to a unified type in the system architecture after decoding. Therefore, the network RTD/RTK cluster, the Ntrip Caster cluster only needs to process a unified format of data, the Station Receiver is compatible with the format of different manufacturers, adopts the idea of layering, so that even if the follow-up need to add new manufacturers, it is only a new addition to a decoding algorithm, the other modules are not affected.

In actual use, not only the network RTD/RTK algorithm cluster can be used, other clusters want to get the source station data can get data from here, it can also provide a variety of flexible ways to obtain data, and it does not cause extra pressure on the Cors station.

5.1.2 High Scalability of System Architecture

Figure 5:
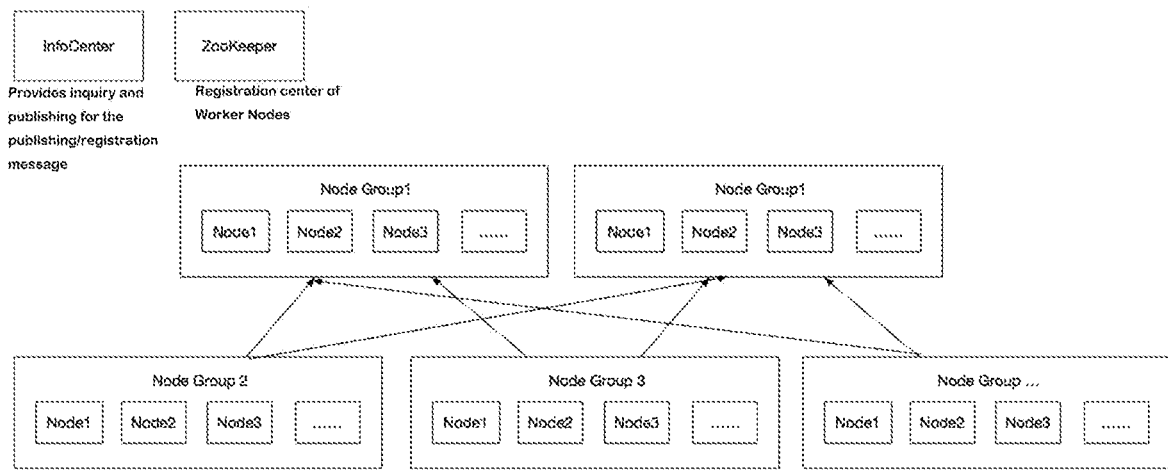
FIG. 5 is an architecture diagram of a scalable system according to fifth embodiment of the present invention.

This architecture has high scalability, as shown in FIG. 5, support both horizontal and vertical scaling. Specific scalability is achieved through Node (A node is a computer or other device connected to a network that has a separate address and has the ability to send or receive data), Node Group, Node Level, Task, InfoCenter, Master Worker, and Zookeeper.

The following is a detailed description of each concept:

a) Task is the concept of a task, a working node can execute multiple Task, Task of working node is assigned by Master from the same Group. Task is an abstract structure, usually some configuration information, Worker begins to work based on this information.

b) Node is the concept of a working node in this architecture, similar to the function of Switch in the network, Node is designed to support plug-and-play, either horizontally or vertically, requiring only different configuration.

c) Node Group is a group of Node, Node of the same function suggested to be assigned to a group. Each group has a Master responsible for Task management.

d) Master, a Master machine in a Node Group, is responsible for assigning Task to each Worker. Master is elected based on the Zookeeper Paxos algorithm, and supports dynamic switching of Master, that is, if the original Master is stopped, the remaining clusters can immediately select a new Master and continue the work of task cleaning and switching.

e) Worker, a Worker machine in a Node Group, is responsible for executing the tasks assigned by the Master. After a Task is executed, you can choose whether you want to register a publish message with Infocenter according to the needs of the cluster, so that machines in other clusters can subscribe to data.

f) Infocenter, information center, is the same registry center. The core of this architecture is the subscribing-publishing service provided, so all publishing information is registered with Infocenter, and all subscribing information by all nodes is also stored at Infocenter for review and modification.

g) ZooKeeper, in this architecture is also a registration center, it mainly registers each Worker node and the specific Task of each Worker node, and Master node information in a Group.

h) Horizontal scalability, the horizontal scalability of this architecture consists of two levels, one is the horizontal scalability within a Group, that is, in a Node Group can add any machine, after the machine is added in, the Master assigns tasks to added machine, to balance Each Worker's workload; the other is the horizontal scalability between different Node Groups, that is, at the same layer, multiple Groups with the same function can be added in, to provide the same function for the lower layer, the lower layer selects a specific Node group to provide service according to different connection strategies.

i) Vertically scalability, vertically scalability refers to the two groups providing the same function, can be arranged in different layers, the lower layer can added layer logic in the connection strategy for specific Group selection.

j) Connection selection strategy, when inquiring the publishing message in Infocenter, there may be multiple providers for a certain message. The specific selection of the provider at this moment can be decided by the connection selection strategy.

k) Task allocation strategy, the task allocation is implemented by the Master. The specific allocation strategy can achieve the best allocation results based on different configurations, with each Worker's hardware configuration.

5.1.3 Infrastructure Diagram

Figure 6:
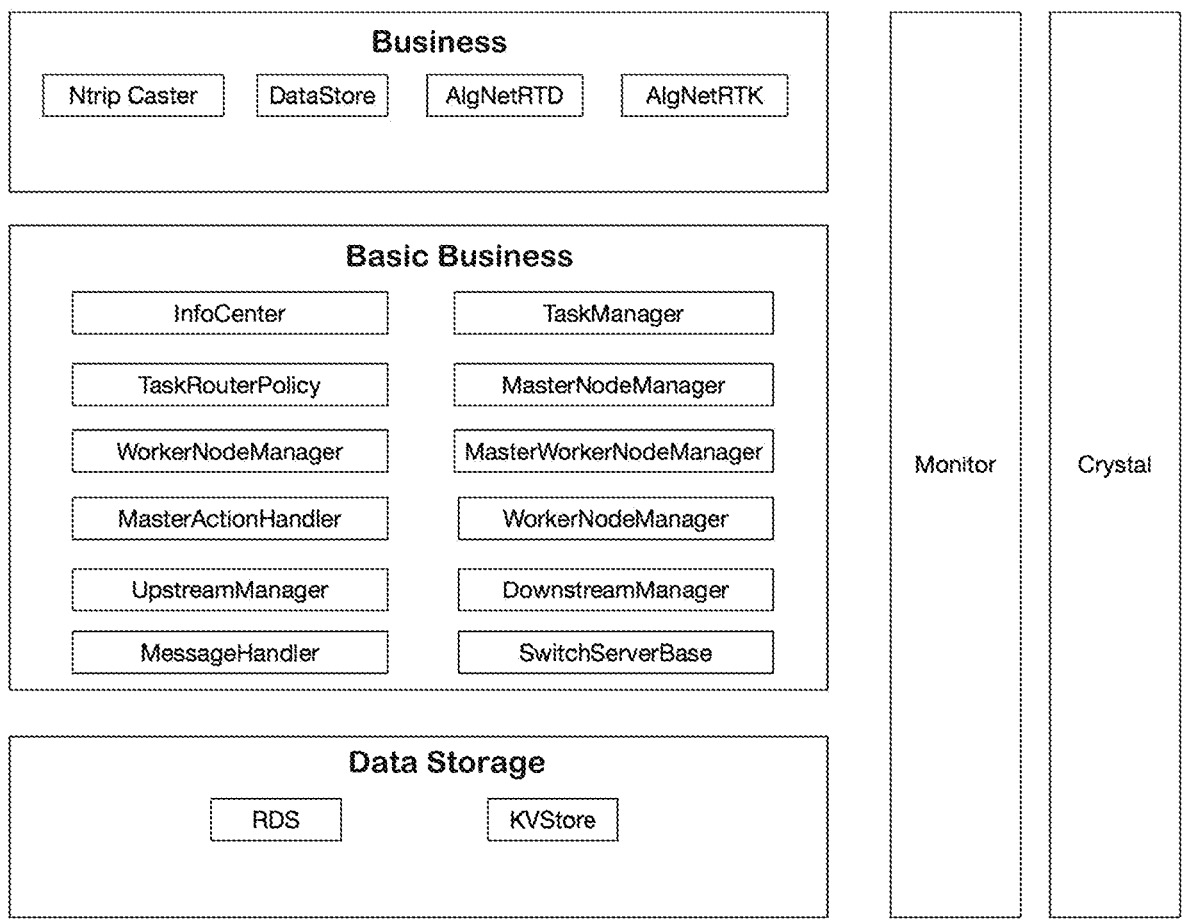
FIG. 6 is an infrastructure diagram according to fifth embodiment of the present invention.

The infrastructure of the architecture, as shown in FIG. 6, is divided into the data storage layer, the basic service layer and the business layer.

The underlying layer is the data storage layer, including RDS (Remote Database Service, relational database service) and KVStore (Key-Value Store, key value storage), is responsible for the storage of basic core data. The data stored here includes the Node Group, Node, source station, and the publishing and subscribing messages. All information in the architecture needs to be read from this layer, in the specific implementation, an RPC (Remote Procedure Call Protocol) service can be used to interact with the data storage layer, and an API (Application Programming Interface) that interacts with the storage layer in each Node can be directly integrated, the specific realization of the specific scene.

The middle is the basic service layer, the internal is the basic abstract module of the framework, respectively are:

a) Infocenter, as mentioned above, Infocenter is the registration center for publishing and subscribing messages in this architecture.

b) TaskManager, is responsible for Task management, and it mainly provides Task assignment, addition, deletion and registration corresponding TaskRoutePolicy (task route strategy). TaskManager is a high-level abstraction, is only responsible for the Task's high-level processing logic, TaskRoutePolicy executes specific Task allocation, because TaskRoutePolicy has multiple implementations, different Node only needs to configure different TaskRoutePolicy in the configuration file for such design.

c) TaskRoutePolicy is responsible for the logic of actual task modification, and it interacts with Zookeeper. Actually adding and deleting Task, TaskRoutePloicy can have many kinds of implementations. For example, when adding a Task, Round-robin and different allocation methods according to weight, etc. can be adopted, and what is the strategy to migrate the task for a new Node adding, etc. The architecture integrates the default TaskRoutePloicy, and the users of the architecture can add custom Policy.

d) MasterNodeManage is responsible for Leader election and monitoring Zookeeper Worker node, responds to the addition and deletion operation of Worker node. Each Node needs to start its own Leader election, of course, there is only one Leader in one group, when the precious Leader is stopped the system will automatically elect a new Leader. After a node becomes a Leader, it responds to Worker node addition and deletion events, When a Worker node is added, it is necessary to equalize the ongoing tasks in the group to the new node. When a Worker node is deleted, it is necessary to balance the task running on the node to other running nodes. To ensure that the Task can maintain state final consistency when the node changes. The module only responds to the Zookeeper events, the specific work is implemented by MasterActionHandler.

e) WorkerNodeManager is responsible for Task node monitoring and maintenance of its own state. When responding to a new Task added, it calls Task addition interface of WorkerActionHandler; when responding to a Task deleted, it calls Task deletion interface of WorkerActionHandler. WorkerNodeManager is responsible for registering its own information to Zookeeper's Worker, and monitoring the connection state of the Zookeeper, maintaining the correctness of the registration information. The module only responds to the Zookeeper events, the specific work is implemented by MasterActionHandler.

f) ServiceAccessor encapsulates the subscribing/publishing and the unsubscribing/unpublishing interface, with which InfoCenter and the database interact.

g) MasterActionHandler is responsible for the specific work that MasterNodeManager delivers to the node after it becomes Master. For example, after a Node becomes a Leader, the MasterActionHandler gets all the Tasks from the storage layer and performs the allocation.

h) WorkerActionHandler is a specific implementation of the Worker node. It is responsible for handling Task delivered by WorkerNodeManager.

i) UpstreamManager is responsible for the actual connection of all subscribing messages.

j) DownstreamManager is responsible for the connection operation of all publishing messages.

k) MessageHandler is a specific message processing class, responsible for how to handle the message after the message arrives. It is generally implemented by the user.

l) SwitchServerBase is responsible for the initialization and startup of the whole structure, such as, starting MasterWorkerNodeManager, TaskManager, UpstreamManager and so on.

m) The top is the business layer, a variety of business can be implemented based on the framework, such as the previously mentioned Ntrip Caster, network RTD and so on.

n) The second one on the right is Monitor, it is responsible for monitoring of the normal operation of the framework, such as process monitoring, connection state monitoring, publishing information monitoring and so on, if abnormal, then sends an alarm message.

o) Most the right side is the crystal, with a web way to easily view and modify the configuration information of the architecture.

5.2 Key Business Process Analysis of the Architecture 5.2.1 Basic Flow Chart of InfoCenter The publishing and subscribing of InfoCenter combined with upstream and downstream data flow management are the basic components of each module in series system framework. Other new modules can be easily added into the framework system if the data of system framework is needed. InfoCenter provides a unified interface for subscribing/publishing, and is responsible for real-time data stream transmission after subscribing/publishing.

InfoCenter comprises the following four modules:

a) InfoCenter: Abstraction of InfoCenter's basic function, and the only interface exposed externally, includes subscribing/cancelling subscribing, publishing/unpublishing functions.

b) UpstreamManager is responsible for the actual connection operation of all subscribing messages. When a message is successfully subscribed, UpstreamManager initiates a connection to the publisher, and receives the data from the publisher. UpstreamManager requests to register a MessageHandler, all the received messages are sent to the MessageHandler for processing.

UpstreamManager also maintains all connection state with the publisher. When a connection is abnormally disconnected or there is no data for a long time, UpstreamManager tries to recover the data connection by sending a heartbeat or re-subscribing to the publishing point to maintain the high availability of the framework.

c) DownstreamManager is responsible for the connection operation of all publishing messages. If a Node wants to publish information to the outside, it is necessary to register the corresponding publishing information in InfoCenter first, then need to start DownstreamManager, open the monitoring port, and wait for the downstream connection.

After the downstream connection is established, DownstreamManager maintains the mapping and connection state of all the messages. Because the downstream subscribing will send specific message type, DownstreamManager can send the message to the downstream without any error when sending the message. DownstreamManager is also responsible for the cleanup of downstream connections, if the connection has been broken or the state is abnormal, DownstreamManager can disconnect the connection and avoid resource waste.

d) ServiceAccessor encapsulates the subscribing/publishing and the unsubscribing/unpublishing interface, with which InfoCenter and the database interact.

The publishing and subscribing process of the whole system are as follows:

Step 1. The source station data receiver cluster wants to obtain the data of CORS station A, it calls the subscribing method and sends "a request of subscribing to the original data of CORS station A" to ServiceAccessor, obtains the connection information of CORS station A. UpstreamManager establishes a connection with CORS station A according to the connection information, and obtains the original data of CORS Station A. If the connection information of CORS station A is not yet ready, InfoCenter maintains the subscribing request and automatically obtains the connection information when the connection information of CORS station A is ready.

Step 2. After the data of CORS Station A are decoded, they are converted into a public data type of the system framework for use by other cluster modules.

Step 3. The source station data receiver cluster calls the publishing method and sends "a request of publishing the public data of CORS station A" to ServiceAccessor, ServiceAccessor stores the request information in the database. In the various embodiments of the present invention, it is preferable to use a common database. The publishing data request contains the connection information of the Worker node that provides the public data of CORS station A.

Step 4. The network RTD/RTK algorithm module is one of the users who send and receive data of the source station. The Subscribing method is called to send "a request of subscribing to the public data of CORS station A" to ServiceAccessor. According to the route selection strategy, the connection information of Worker that provides the public data of CORS station A is obtained, then Upsteamanager of the algorithm module establishes a connection with Downstreammanager of the Worker. After the connection is established, the public data of the CORS station A sent by the worker is obtained. The algorithm module uses the public data of CORS station A to generate RTCM data through algorithm operation.

Step 5. The process of subscribing to the RTCM data by the NTRIP Caster cluster is similar to the steps above.

The following is the CORS station offline process:

Step 1. When the CORS station A goes offline, the source station data receiver module calls the unpublishing method to generate "a request of unpublishing the public data of the CORS station A" and "a message of unpublishing the public data of the CORS station A" to the ServiceAccessor.

Step 2. The ServiceAccessor deletes the message of publishing the public data of the CORS Station A in the database.

Step 3. The algorithm module cancels the connection with the source station data receiver module Worker after receiving "the message of unpublishing the public data of the CORS station A". Then the unsubscribing method is called to send "a request of unsubscribing to the public data of CORS station A" to the ServiceAccessor, and the subscribing message in the database are deleted.

Step 4. The algorithm module calls the unpublishing method to generate "a request of unpublishing the RTCM data of the CORS station A" and "a message of unpublishing the RTCM data of the CORS station A" to the ServiceAccessor, and deletes the message of publishing the RTCM data.

Step 5. The process of unsubscribing by the NTRIP Caster cluster is similar to the steps above.

During the whole process of publishing, subscribing and establishing connections, shields the specific machine information, the framework users only need to care about what data they need, the system framework itself flexibly establishes the connection with the upstream work node according to the route selection strategy, which facilitates the serialization and management of the upstream and downstream modules, saves the cost of repeated development. The mode of combing publishing, subscribing, and the upstream and downstream data management at the same time is also a novel and innovative mode.

5.2.2 Zookeeper Storage Hierarchy

Figure 7:
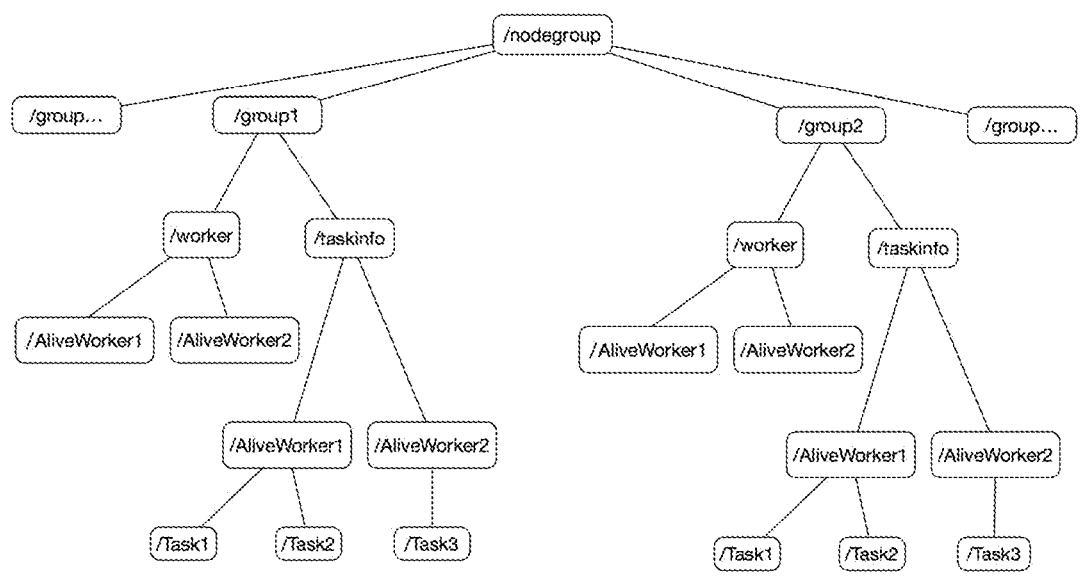
FIG. 7 is a storage relation diagram according to fifth embodiment of the present invention.

The TaskWorker storage relationship of the Zookeeper is shown in FIG. 7. The root node is the Nodegroup, the sub-nodes under it are each Group, each Group includes Worker and Taskinfo (task information).

The Worker node stores the temporary node of the Zoo-Keeper, and stores the Worker actually running in the group. The characteristic of the node is that when the Worker is actually running, the node exists. Therefore, the worker that is stored under the node is the actually normal running worker. If a Worker stops or is down, then there is no such node under the Worker. Among them, the AliveWorker refers to the still running Worker.

The Taskinfo stores the permanent nodes, the nodes below the Taskinfo are also the Workers' name, corresponding to the names of the Worker nodes, then each Worker has individual Task node below, indicates the Task that the Worker is running.

The Zookeeper is responsible for the notification of the node. When assigning a Task to a Worker, you only need to create a Task node under the Worker's Taskinfo. Then the monitoring thread of the Worker listens to this addition, and then points to the specific process of Task startup.

5.2.3 Timing Diagram of the Framework Startup

When the system is started, the relevant content is initialized according to the injection parameters, and Register the MasterActionHandler, the WorkerActionHandler, the RoleActionHandler and the NodeActionHandler through initialization method After the node manager is started, the Leader performs the cleanup for the subscribing and publishing data of the failed node. After the cleanup is completed, new tasks are reassigned, and at the same time the monitoring logic of the working node and the task node is started. When the task node is newly added, tasks are reassigned to achieve load balancing. When the working node and the Leader node fail, the task switching is also an important means to ensure the high availability of the whole cluster. The state of the working node and the Leader node are monitored by the Zookeeper, and the data of the failed working node are migrated to the active node. Similarly, when the Leader node fails, the Leader node can be re-elected to obtain a new Leader.

For the architecture, the architecture of the present invention supports both horizontal and vertical scaling. Horizontal scaling that is, a group of machines if the performance reaches the bottleneck, can arbitrarily increase the machine, the new added machine can automatically balance out the task of other machines to achieve a load balancing effect. Vertical scaling has a layering concept. Clusters that provide the same function can be divided into several layers. The lower layer chooses which host of which layer to connect according to different connection selection strategies. Horizontal and vertical scaling ensures the high scalability of the present invention.

The effect that can be achieved by the present invention:

1. Eliminate the dependence on the manufacturers. The present invention provides a unified coding/decoding method to receive CORS station data from different manufacturers, and decode the data into a standard internal format through different decoding algorithms, which facilitates the use for internal projects, and then code the data into the standard RTCM Data and broadcast through the NTRIP protocol when needs to be broadcasted out 2. No networking limits. The purpose of the present invention is to support "the nationwide network" plan, that is, all the CORS stations in China can access the system, and the system provides a unified service without geographic restriction.

3. High availability. The invention is structured based on Aliyun ECS to ensure high availability of server hardware; Based on the distributed architecture, the system can still perform task switching dynamically after a small number of servers are down and continue to ensure high-quality services; Based on the network RTK/RTD algorithm, in the case of one or a small number of CORS stations have a problem, the system can still continue to improve the broadcast service by connecting to other base stations 4. High scalability. If the system needs to modify the configuration of the CORS station and the configuration of the running node, only the database needs to be modified, and the hot backup is supported after the modification, the previously running program does not need to be restarted and has high scalability.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

What is claimed is:

1. A method for data subscribing and publishing in large scale CORS (Continuous Operation Reference Station) station broadcast system, wherein, the method comprises the following steps:
a source station data receiver cluster requests to subscribe to the original data of the CORS station, and obtains connection information of the CORS station;
the source station data receiver cluster establishes a connection with the CORS station, obtains the original data of the CORS station and stores the original data of the CORS station in a server of the source station data receiver cluster;
the source station data receiver cluster requests to publish the original data of the CORS station, and stores the message of requesting to publish the original data of the CORS station and the connection information of the server storing the original data of the CORS station in a database; and
a network RTD (Real-time Differential)/RTK (Real-time Kinematic) (algorithm cluster requests to subscribe to the original data of the CORS station, obtains the connection information of the server storing the original data of the CORS station from the database and establishes a connection with the server, obtains the original data of the CORS station, and stores the message of subscribing to the original data of the CORS station in the database;
the network RTD/RTK algorithm cluster generates RTCM (Radio Technical Commission for Maritime services) data of the CORS station by algorithmic operation of the original data of the CORS station, and stores the RTCM data of the CORS station in a server of the network RTD/RTK algorithm cluster;
the network RTD/RTK algorithm cluster requests to publish the RTCM data of the CORS station, and stores the message of requesting to publish the RTCM data of the CORS station and the connection information of the server storing the RTCM data of the CORS station in the database; and
NTRIP (Networked Transport of RTCM via Internet Protocol) Caster cluster requests to subscribe to the RTCM data of the CORS station, obtains the connection information of the server storing the RTCM data of the CORS station from the database and establishes a connection with the server, obtains the RTCM data of the CORS station, and stores the message of subscribing to the RTCM data of the CORS station in the database.

2. The method for data subscribing and publishing in large scale CORS station broadcast system according to claim 1, wherein, the step of "obtains the original data of the CORS station and stores the original data of the CORS station in a server of the source data receiver cluster" further comprises the following sub-step:
the original data of the CORS station are decoded and converted into a public data type for use by other clusters.

3. The method for data subscribing and publishing in large scale CORS station broadcast system according to claim 1, wherein, the method further comprises the following steps:
when the CORS station goes offline, the source station data receiver cluster requests to unpublish the original data of the CORS station, sends the message of unpublishing the original data of the CORS station, and deletes the message of requesting to publish the original data of the CORS station in the database;
the network RTD/RTK algorithm cluster receives the message of unpublishing the original data of the CORS station, cancels the connection with the server storing the original data of the CORS station, and deletes the message of subscribing to the original data of the CORS station in the database; and
the network RTD/RTK algorithm cluster requests to unpublish the RTCM data of the CORS station, sends the message of unpublishing the RTCM data of the CORS station, and deletes the message of requesting to publish the RTCM data of the CORS station in the database.

4. The method for data subscribing and publishing in large scale CORS station broadcast system according to claim 3, wherein, the method further comprises the following step:
the NTRIP Caster cluster receives the message of unpublishing the RTCM data of the CORS station, cancels the connection with the server storing the RTCM data of the CORS station, and deletes the message of subscribing to the RTCM data of the CORS station in the database.

5. A device for data subscribing and publishing in large scale CORS (Continuous Operation Reference Station) station broadcast system, wherein, the device comprises: a source station data receiver cluster, a network RTD (Real-time Differential)/RTK (Real-time kinematic) algorithm cluster, a database and a plurality of CORS stations;
the source station data receiver cluster comprises: a subscribing module, a publishing module and a plurality of servers;
the subscribing module of the source station data receiver cluster configured to request to subscribe to the original data of the CORS station, and obtain connection information of the CORS station; and establish a connection with the CORS station, obtain the original data of the CORS station and store the original data of the CORS station in the servers of the source station data receiver cluster;
the publishing module of the source station data receiver cluster configured to request to publish the original data of the CORS station, and store the message of requesting to publish the original data of the CORS station and the connection information of the server storing the original data of the CORS station in the database; and
the network RTD/RTK algorithm cluster comprises: a subscribing module configured to request to subscribe to the original data of the CORS station, obtain the connection information of the server storing the original data of the CORS station from the database and establish a connection with the server, obtain the original data of the CORS station, and store the message of subscribing to the original data of the CORS station in the database;
the device further comprises: a NTRIP Caster cluster;

the network RTD/RTK algorithm cluster further comprises: an operation module, a publishing module and a plurality of servers;

the operation module configured to generate RTCM (Radio Technical Commission for Maritime services) data of the CORS station by algorithmic operation of the original data of the CORS station, and store the RTCM data of the CORS station in the servers of the network RTD/RTK algorithm cluster;

the publishing module of the network RTD/RTK algorithm cluster configured to request to publish the RTCM data of the CORS station, and store the message of requesting to publish the RTCM data of the CORS station and the connection information of the server storing the RTCM data of the CORS station in the database; and the NTRIP (Networked Transport of RTCM via Internet Protocol) Caster cluster comprises: a subscribing module configured to request to subscribe to the RTCM data of the CORS station, obtain the connection information of the server storing the RTCM data of the CORS station from the database and establish a connection with the server, obtain the RTCM data of the CORS station, and store the message of subscribing to the RTCM data of the CORS station in the database.

6. A device for data subscribing and publishing in large scale CORS station broadcast system according to claim 5, wherein, the source station data receiver cluster further comprises: a decoding module configured to decode the original data of the CORS station obtained by the subscribing module of the source station data receiver cluster and convert the original data of the CORS station into a public data type for use by other clusters.

7. A device for data subscribing and publishing in large scale CORS station broadcast system according to claim 5, wherein, the source station data receiver cluster further comprises: an unpublishing module;

the unpublishing module of the source station data receiver cluster configured to request to unpublish the original data of the CORS station when the CORS station goes offline, send the message of unpublishing the original data of the CORS station, and delete the message of requesting to publish the original data of the CORS station in the database;

the network RTD/RTK algorithm cluster further comprises: an unsubscribing module and an unpublishing module;

the unsubscribing module of the network RTD/RTK algorithm cluster configured to receive the message of unpublishing the original data of the CORS station, cancel the connection with the server storing the original data of the CORS station, and delete the message of subscribing to the original data of the CORS station in the database; and the unpublishing module of the network RTD/RTK algorithm cluster configured to request to unpublish the RTCM data of the CORS station, send the message of unpublishing the RTCM data of the CORS station, and delete the message of requesting to publish the RTCM data of the CORS station in the database.

8. A device for data subscribing and publishing in large scale CORS station broadcast system according to claim 7, wherein, the NTRIP Caster cluster further comprises: an unsubscribing module configured to receive the message of unpublishing the RTCM data of the CORS station, cancel the connection with the server storing the RTCM data of the CORS station, and delete the message of subscribing to the RTCM data of the CORS station in the database.

* * * * *